US012593744B2

(12) United States Patent
Abeles

(10) Patent No.: US 12,593,744 B2
(45) Date of Patent: Apr. 7, 2026

(54) APPARATUS AND METHOD OF EXTRACTING WATER-SOLUBLE MINERALS FROM AN ARID ENVIRONMENT

(71) Applicant: VIRIDIS ARBOR LLC, Verona, NJ (US)

(72) Inventor: Gary E. Abeles, Verona, NJ (US)

(73) Assignee: VIRIDIS ARBOR LLC, Verona, NJ (US)

( * ) Notice: Subject to any disclaimer, the term of this patent is extended or adjusted under 35 U.S.C. 154(b) by 0 days.

(21) Appl. No.: 19/317,745

(22) Filed: Sep. 3, 2025

(65) Prior Publication Data

US 2026/0000011 A1 Jan. 1, 2026

Related U.S. Application Data

(63) Continuation-in-part of application No. 19/229,385, filed on Jun. 5, 2025, now Pat. No. 12,453,303, which
(Continued)

(51) Int. Cl.
*A01C 14/00* (2006.01)
*A01C 1/04* (2006.01)
(Continued)

(52) U.S. Cl.
CPC .............. *A01C 14/00* (2013.01); *A01C 1/044* (2013.01); *A01G 13/21* (2025.01); *A01G 20/20* (2018.02);
(Continued)

(58) Field of Classification Search
CPC ......... A01C 14/00; A01C 1/044; A01C 21/00; A01G 20/20; A01G 31/02; A01G 25/165; A01G 31/065
See application file for complete search history.

(56) References Cited

U.S. PATENT DOCUMENTS 3,698,131 A * 10/1972 Kesinger ................ A01G 9/242
47/29.1
3,733,745 A * 5/1973 Ingerstedt .............. A01G 9/029
47/77
(Continued)

FOREIGN PATENT DOCUMENTS

EP 3570653 B1 * 12/2020 ............. A01C 1/044
WO 2024159324 A1 8/2024

OTHER PUBLICATIONS

Notice of Allowance for U.S. Appl. No. 19/003,522 mail date Nov. 25, 2025, 14 pages.

*Primary Examiner* — Monica L Perry
(74) *Attorney, Agent, or Firm* — Maine Cernota & Curran

(57) ABSTRACT

A method of extracting water-soluble minerals from an arid location includes identifying or establishing a channel of flowing water at the arid location, and installing a mat containing seeds, and/or seedlings, and a super absorbent polymer (SAP). A perforated, transparent cover sheet is placed on or above the mat. Water is applied to the SAP, such that both edible and dam-constructing vegetation grows and matures from the mat. Beavers are introduced into the arid location, which eat the edible vegetation and use the dam-constructing vegetation to construct a dam that blocks the channel, thereby flooding a region proximate the channel. After the flood water has dissolved the minerals in the flooded region, it is drained and processed to extract the minerals. The drained water can be remotely processed, or directed to an evaporation pond, where the minerals remain while the water is evaporated, recaptured, and reintroduced into the channel.

20 Claims, 12 Drawing Sheets

Related U.S. Application Data is a continuation-in-part of application No. 19/065,443, filed on Feb. 27, 2025, now Pat. No. 12,349,618, which is a continuation-in-part of application No. 19/003,522, filed on Dec. 27, 2024, which is a continuation-in-part of application No. 17/667,306, filed on Feb. 8, 2022, now Pat. No. 12,213,397, which is a continuation-in-part of application No. 16/853,981, filed on Apr. 21, 2020, now Pat. No. 11,277,962, which is a continuation of application No. 15/476,017, filed on Mar. 31, 2017, now Pat. No. 10,660,264, which is a continuation-in-part of application No. 14/203,872, filed on Mar. 11, 2014, now Pat. No. 9,629,341.

(60) Provisional application No. 61/786,721, filed on Mar. 15, 2013.

(51) Int. Cl.

| | |
|---|---|
| *A01G 13/21* | (2025.01) |
| *A01G 20/20* | (2018.01) |
| *A01C 21/00* | (2006.01) |
| *A01G 24/35* | (2018.01) |

(52) U.S. Cl.
CPC .............. *A01C 21/00* (2013.01); *A01G 24/35* (2018.02); *Y02A 40/28* (2018.01)

(56) References Cited

U.S. PATENT DOCUMENTS

| | | | | |
|---|---|---|---|---|
| 3,807,088 | A | 4/1974 | Jones | |
| 3,962,823 | A * | 6/1976 | Zipperer, III | A01G 24/50 383/105 |
| 4,242,833 | A | 1/1981 | Maes, Jr. | |
| 4,285,162 | A * | 8/1981 | Hilton | A01G 9/1438 47/29.1 |
| 4,318,248 | A * | 3/1982 | Muldner | A01G 20/20 47/56 |
| 4,798,023 | A * | 1/1989 | Morssinkhof | A01G 13/24 47/29.1 |
| 5,423,148 | A * | 6/1995 | Thornhill | A01G 9/12 47/29.1 |
| 5,598,661 | A * | 2/1997 | Eiderman | A01G 9/247 203/DIG. 1 |
| 5,887,382 | A * | 3/1999 | Marshall | A01C 1/044 47/74 |
| 5,911,632 | A * | 6/1999 | Ko | A01C 7/00 111/199 |
| 8,256,160 | B2 * | 9/2012 | Rubin | B01J 20/16 47/58.1 SC |
| 10,687,474 | B2 * | 6/2020 | Abeles | B01D 3/02 |
| 12,349,618 | B2 * | 7/2025 | Abeles | A01G 20/20 |
| 12,453,303 | B2 * | 10/2025 | Abeles | A01G 29/00 |
| 2002/0134010 | A1 * | 9/2002 | Rohrborn, Jr. | A01G 13/26 47/29.1 |
| 2007/0163172 | A1 * | 7/2007 | Savich | A01C 1/044 47/56 |
| 2007/0193116 | A1 * | 8/2007 | Luckett | A01G 20/20 47/65.9 |
| 2009/0205248 | A1 * | 8/2009 | Phelps | A01G 13/24 47/29.1 |
| 2009/0293350 | A1 * | 12/2009 | Kania | A01G 13/10 47/20.1 |
| 2010/0050509 | A1 * | 3/2010 | Luckett | A01G 20/20 47/65.9 |
| 2010/0236142 | A1 * | 9/2010 | Drewry | A01G 13/20 47/29.1 |
| 2013/0192131 | A1 * | 8/2013 | Abahusayn | A01G 9/14 47/17 |
| 2015/0201565 | A1 * | 7/2015 | Toye | A01G 13/21 47/29.1 |
| 2015/0223409 | A1 | 8/2015 | Abahusayn | |
| 2018/0020626 | A1 | 1/2018 | Kellogg | |
| 2020/0182493 | A1 | 6/2020 | Luttik | |
| 2023/0148487 | A1 | 5/2023 | Croce | |
| 2023/0403995 | A1 | 12/2023 | Despujols | |
| 2025/0194457 | A1 * | 6/2025 | Abeles | A01C 1/044 |
| 2025/0295055 | A1 * | 9/2025 | Abeles | A01G 13/21 |
| 2025/0330116 | A1 | 10/2025 | Allen | |

* cited by examiner

~ 100

APPARATUS AND METHOD OF EXTRACTING WATER-SOLUBLE MINERALS FROM AN ARID ENVIRONMENT

RELATED APPLICATIONS

This application is a continuation in part of U.S. application Ser. No. 19/229,385, filed on Jun. 5, 2025. Application Ser. No. 19/229,385 is a continuation in part of U.S. application Ser. No. 19/065,443, filed on Feb. 27, 2025, now U.S. Pat. No. 12,349,618. Application Ser. No. 19/065,443 is a continuation in part of U.S. application Ser. No. 19/003,522, filed on Dec. 27, 2024. Application Ser. No. 19/003,522 is a continuation in part of U.S. application Ser. No. 17/667,306, filed on Feb. 8, 2022, now U.S. Pat. No. 12,213,397. Application Ser. No. 17/667,306 is a continuation in part of U.S. application Ser. No. 16/853,981, filed on Apr. 21, 2020, now U.S. Pat. No. 11,277,962. Application Ser. No. 16/853,981 is a continuation of U.S. application Ser. No. 15/476,017, filed Mar. 31, 2017, now U.S. Pat. No. 10,660,264. Application Ser. No. 15/476,017 is a continuation in part of U.S. application Ser. No. 14/203,872, filed Mar. 11, 2014, now U.S. Pat. No. 9,629,341. Application Ser. No. 14/203,872 claims the benefit of U.S. provisional application 61/786,721, filed Mar. 15, 2013. All of these applications are herein incorporated by reference in their entirety for all purposes.

FIELD OF THE INVENTION

The invention relates to apparatus and methods for extracting water-soluble minerals from arid environments, and more specifically to apparatus and methods for applying water to an arid environment so as to extract water soluble minerals therefrom.

BACKGROUND OF THE INVENTION

Minimal rainfall, together with high average temperatures and low humidity, are the main features that define an arid environment. When a hot, arid location is devoid of mature vegetation, the scarcity of water is typically multiplied, because high temperatures and the prevalence of unshaded sunshine can tend to quickly evaporate any moisture that is present.

Some arid environments are located in regions that, in the geologic past, were covered by a body of water. These include dry lakebeds, as well as regions that were formerly river deltas, ocean inlets, and shallow sea bottoms, which over geologic time periods became isolated from their former source of water and became dry and arid.

With reference to FIG. 1A, arid environments 102 that were previously covered by water sometimes comprise significant deposits of salt and/or other water-soluble minerals 104 that were previously dissolved by flowing water in other locations, and then carried to and deposited in the former lakebed or other environment. If the former body of water was subject to significant evaporation, such mineral deposits 104 tend to become concentrated over time, as the water evaporates and new water enters the region, bringing additional minerals that precipitate and are deposited.

If extraction of the water-soluble minerals 104 from an arid environment 102 is desirable, one approach is to use heavy machinery to excavate the mineral-containing ground and carry it to remote facilities where the minerals 104 can be extracted. However, this is a costly and labor-intensive process.

Water that originates in neighboring non-arid regions, such as surrounding mountains, is sometimes present in arid environments, flowing through rivers, aqueducts, and/or other natural and/or man-made channels. However, unlike rainfall, which is broadly distributed, water flowing in channels through an arid region is confined to the channels in which it flows The Great Salt Lake region of Utah is an example of a hot, arid region that contains deposited, water-soluble minerals, includes rivers, and yet supports little vegetation. At least four rivers flow into the Great Salt Lake, which are the Bear, Jordan, Ogden, and Weber rivers. Despite the presence of water flowing in these rivers, most of the surrounding region is arid, and vegetation is sparse. In recent times, more and more water from these rivers has been diverted away from the Great Salt Lake for use in agriculture, and to satisfy the requirements of residents in and near Salt Lake City.

The Great Salt Lake is surrounded by more than 102,000 acres of solar evaporation ponds that are used for extracting minerals from the residual lake water that is present in the lake. Numerous types of salts, metals and other minerals are extracted from these ponds, with an estimated value of close to $300 million per year. However, this approach is only effective for extracting minerals that are dissolved in the existing, pooled water, and cannot be used to extract minerals from the surrounding arid regions that were formerly part of the lake bottom in the geologic past.

What is needed, therefore, is a method of economically extracting water-soluble minerals from dry lakebeds and other arid regions.

SUMMARY OF THE INVENTION

The present invention is an apparatus and method for economically extracting water-soluble minerals from dry lakebeds and other arid regions.

According to the disclosed method, either water is already present in a channel, such as a stream and/or aqueduct, within the remote arid environment, and/or water is diverted into a channel from a source outside of the remote arid environment. The channel is temporarily blocked, causing the water to overflow the banks of the channel, and to cover and flood a surrounding region of the arid environment, where it pools and dissolves the included minerals from the underlying ground. The water with dissolved minerals is then drained from the flooded region, and either transported to a remote facility for further processing, or diverted to a local solar evaporation pond, where the water is allowed to evaporate, leaving the extracted minerals behind.

Rather than building a costly and impractical network of dams and artificial rivulets to flood a selected region, the disclosed method makes use of the natural ability of beavers to build dams and create wetlands. As is well known, beavers will naturally build dams whenever they are given access to a channel of flowing water, and to vegetation that is suitable to their needs, both as food and as building materials. When water is available in a selected region of a remote arid environment, or when it can be made available, it is then only necessary to introduce beavers and sufficient vegetation into the selected region, and then to allow nature to take its course.

If flowing water is not present in the arid environment, or if it is insufficient, then water from an underground aquifer, or from surrounding, non-arid regions, such as nearby mountains, is directed into one or more channels that flow through the remote arid region. Also, if water is being evaporated in a solar evaporation pond in a location that adjoins the arid region, the evaporation pond can be modified or replaced with a system that retains the water when separating the salt and/or minerals from the water, and then the retained water can be directed into one or more channels that flow through the remote arid region.

According to the disclosed invention, vegetation is introduced into the arid environment by locating a mat assembly near the channel of water. The mat assembly includes a mat impregnated with seeds and/or seedlings, and with a "super absorbent polymer" or "SAP," where the seeds and/or seedlings comprise seeds or seedling of vegetation that can be eaten by beavers, as well as vegetation that can be used by beavers to build dams.

In embodiments, the mat is a biodegradable coir mat, and/or the SAP is biodegradable. In some of these embodiments, the SAP is a cellulose-based or starch-based polymer. In some embodiments, fertilizer is included in the mat. And in various embodiments at least one of sand and soil is included in the mat. The included sand or soil in some of these embodiments has a composition that is similar to sand or soil that is indigenous to the hot, arid, region.

The mat is placed either at grade or slightly below grade, and sufficient fresh water is applied to cause the SAP to become hydrated, thereby enabling the seeds and/or seedlings to sprout and take root in the mat. In some cases, the natural precipitation may be sufficient to achieve this purpose, for example if the region experiences a "rainy" season when precipitation is briefly plentiful. In other cases, the required fresh water is diverted from the flowing water that is present in the region.

In various embodiments, once the mat is placed at the hot, arid location, it is covered by a perforated cover sheet that is transparent or semi-transparent. The cover sheet serves as a physical barrier to water vapor beneath the cover sheet that is formed by evaporating dew, and by any moisture that is evaporated from the ground or mat, so that the water vapor tends to condense on the under-side of the cover sheet, and to drip back onto the mat, where it is absorbed by the SAP.

In some of these embodiments the cover sheet is placed directly onto the mat, whereby the growing vegetation lifts the cover sheet, and in embodiments eventually breaks through the cover sheet. In other embodiments, the cover sheet is supported above the mat by a support structure, such as a plurality of stakes. The perforations can be made in locations where depressions in the cover sheet will naturally form between the stakes or other supports, so that any rain that falls onto the cover sheet will drain through the perforations, and be absorbed by the SAP in the underlying mat.

The opacity of the cover sheet can be increased by printing a pattern onto the cover sheet, adding a dye to the cover sheet material, or by any other means known in the art, so as to reduce the intensity of light reaching the mat, and thereby reduce solar heating, by emulating the shade that would be provided by mature vegetation in an established ecosystem.

Embodiments further include a water barrier placed below the mat which prevents any water that is not retained by the mat and SAP from reaching the underlying soil or sand. This feature can be especially helpful in sandy locations where any moisture that reaches the underlying sand will be quickly absorbed and lost. The water barrier can be a plastic sheet, and can be cellulosic or otherwise biodegradable.

When the vegetation arising from the mat is sufficiently mature, the beavers are introduced into the region, where they disperse and build one or more dams that block one or more of the channels carrying the water that flows through the arid region, thereby causing the water to extend beyond the blocked channel or channels, so that it floods a nearby region within the arid environment.

After sufficient time has elapsed to allow the water to dissolve the underlying minerals, the water is drained from the flooded region. In some embodiments, the drained water is transported to a remote facility where the dissolved minerals are extraction, for example by reverse osmosis. In other embodiments, the drained water is directed to one or more solar evaporation ponds, where the water is evaporated, leaving behind the extracted minerals. In some of these embodiments, the evaporated water is recaptured, e.g. by locating a slanted, transparent cover over the evaporation pond that causes the evaporated water to condense and be drained away. The recaptured water is then introduced into a channel through which it flows back into the arid region. The water is thereby recirculated between the evaporation pond and the arid environment, allowing the same water to deliver multiple "batches" of minerals to the evaporation pond.

The present invention is a method of extracting water-soluble minerals from an arid location. The method includes identifying or establishing a channel of flowing water at the arid location, and placing a mat assembly at the arid location. The mat assembly includes a mat, a super-absorbent polymer ("SAP") cooperative with the mat, and seeds and/or seedlings cooperative with the mat, the seeds and/or seedlings comprising seeds and/or seedlings of edible vegetation and seeds and/or seedlings of vegetation that is suitable for constructing dams.

The method further includes applying fresh water to the mat, thereby hydrating the SAP in the mat, allowing the seeds and/or seedlings to mature into the edible vegetation and the vegetation that is suitable for constructing dams, placing beavers at the arid location, allowing the beavers to eat the edible vegetation, and to construct at least one dam across the channel of flowing water using the vegetation that is suitable for constructing dams, thereby causing the water to flood a region proximate the channel, allowing the water to remain in the flooded region, thereby causing the water-soluble minerals to be dissolved in the water, removing the water from the flooded region, and extracting the water-soluble minerals from the water.

In embodiments, applying the fresh water to the mat comprises applying water from the channel of flowing water to the mat.

In any of the above embodiments, the vegetation can include at least one of bushes and trees.

In any of the above embodiments, the mat can include coir.

In any of the above embodiments, the mat assembly can further comprise fertilizer cooperative with the mat.

In any of the above embodiments, the mat assembly can further comprise at least one of sand and soil cooperative with the mat.

In any of the above embodiments, the mat assembly can further comprise a perforated, transparent or translucent cover sheet covering the mat. In some of these embodiments, the cover sheet is applied directly to the mat, such that it rests on the mat. In other of these embodiments, the cover sheet is suspended above the mat by a support structure. In some of these embodiments, the support structure includes a plurality of stakes that support the cover sheet at spaced-apart support locations below the cover sheet. In some of these embodiments, the cover sheet is perforated at locations that are spaced apart from the support locations of the stakes.

In any of the above embodiments, the mat assembly can further comprise a water barrier installed below the mat.

In any of the above embodiments, establishing the channel of flowing water at the arid location can comprise drawing water from an underground aquifer and causing it to flow into the channel of flowing water.

In any of the above embodiments, establishing the channel of flowing water at the arid location can comprise drawing water from a surrounding non-arid region and causing it to flow into the channel of flowing water.

In any of the above embodiments, establishing the channel of flowing water at the arid location can comprise desalinating brackish water and causing it to flow into the channel of flowing water.

In any of the above embodiments, establishing the channel of flowing water at the arid location can comprise modifying or replacing at least one solar evaporation pond within the arid location, such that water previously lost to evaporation from the solar evaporation pond is retained and caused to flow into the channel of flowing water.

In any of the above embodiments, extracting the water-soluble minerals from the water can comprise transporting the water to a remote facility where the water-soluble minerals are extracted from the water. In some of these embodiments, the minerals are extracted from the water using reverse osmosis.

In any of the above embodiments, extracting the water-soluble minerals from the water can comprise directing the water to an evaporation pond where the water evaporates, while the water-soluble minerals are retained. And in some of these embodiments, the method further comprises recapturing the water that is evaporated from the evaporation pond, and returning the recaptured water to the channel.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present invention is an apparatus and method for economically extracting water-soluble minerals from dry lakebeds and other arid regions.

Figure 1A:
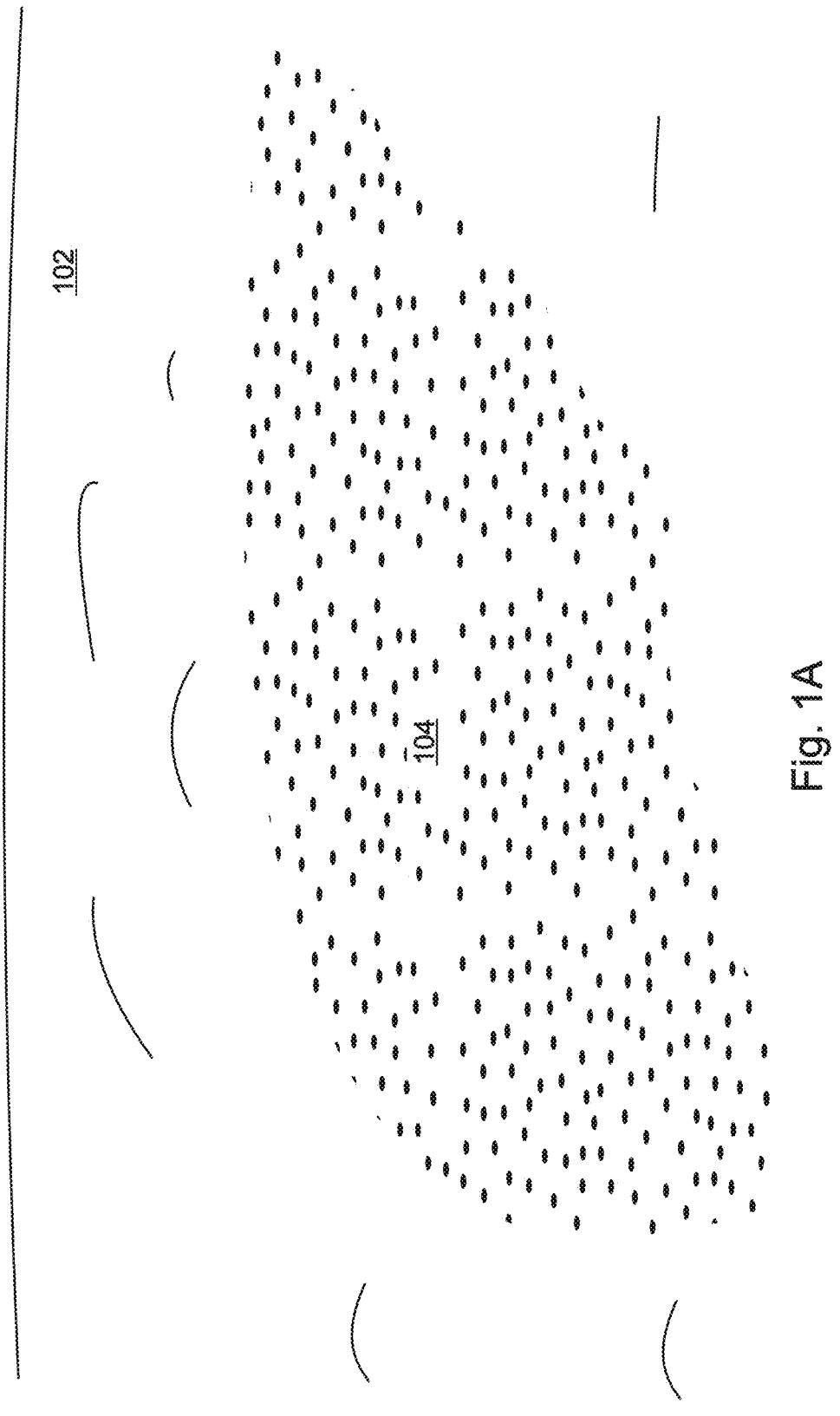
FIG. 1A is a perspective view from above of an arid region that contains water-soluble minerals.
Figure 1B:
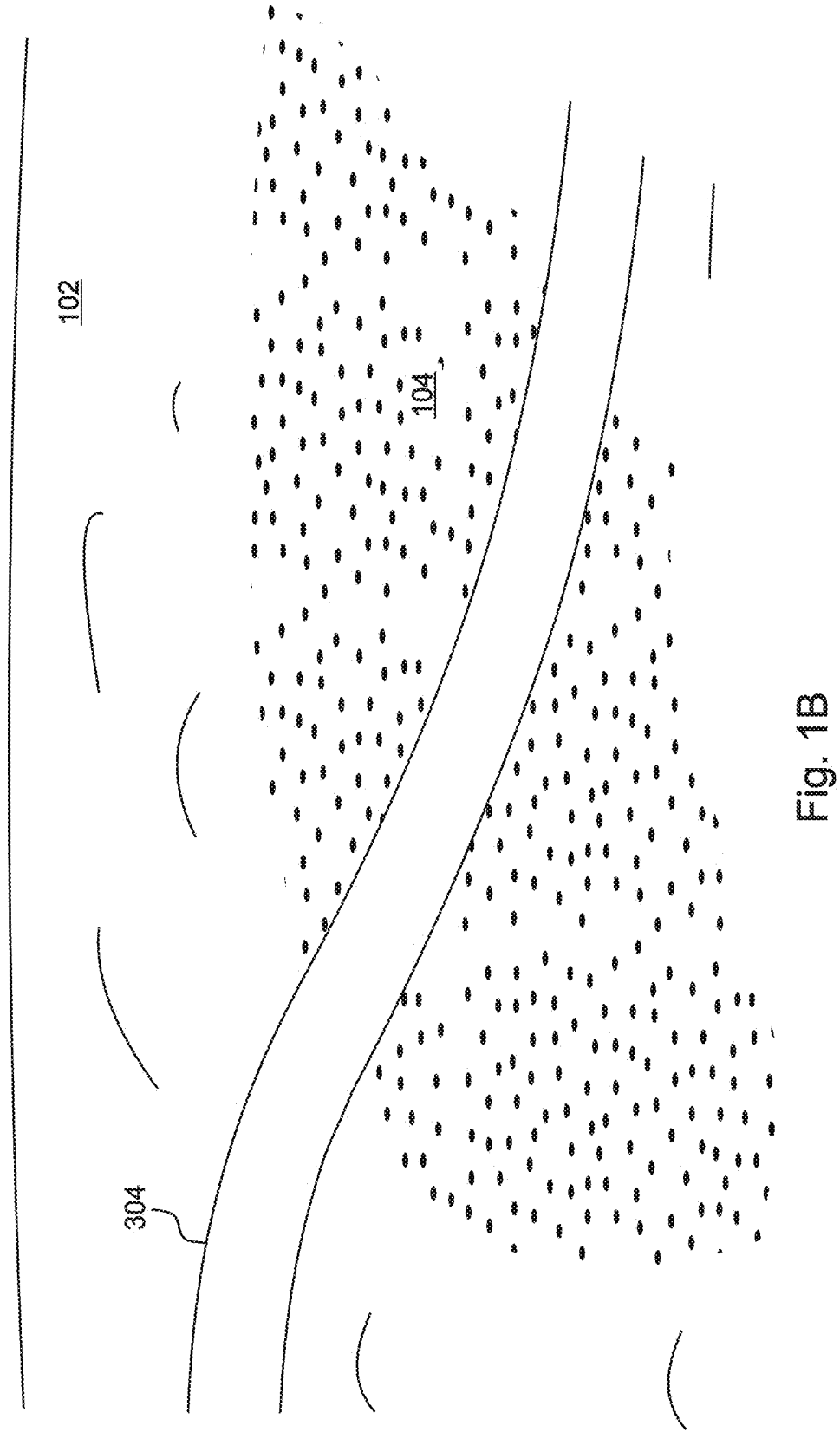
FIG. 1B is a perspective view from above of a region similar to FIG. 1A, through which water flows through a channel.

With reference to FIG. 1B, according to the disclosed method, water that is flowing in a channel 304, such as a stream and/or aqueduct, within the remote arid environment, is temporarily blocked, causing the water to overflow the banks of the channel, and to cover and flood a surrounding region of the arid environment, where it pools and dissolves the included minerals from the underlying ground. The water with dissolved minerals is then drained from the flooded region, and either transported to a remote facility for further processing, or diverted to a local solar evaporation pond, where the water is allowed to evaporate, leaving the extracted minerals behind.

If flowing water is not present in the remote arid environment, or if it is insufficient, then water from an underground aquifer, or from surrounding non-arid regions such as nearby mountains, can be at a nearby, accessible location, and directed into one or more channels 304 that flow through the remote arid region 102. If brackish water is available, for example if the arid region is proximate the Great Salt Lake, the brackish water can be desalinated, for example using reverse osmosis, and then the resulting fresh water can be directed into one or more channels 304 that flow through the remote arid region. Similarly, if water is being evaporated in solar evaporation ponds in an accessible location that adjoins the remote arid region, for the purpose of extracting salt and/or other minerals from the water, the evaporation ponds can be modified or replaced with systems that retain the water when separating the salt and/or minerals from the water, and then the retained fresh water can be directed into one or more channels 304 that flow through the remote arid region.

Figure 2A:
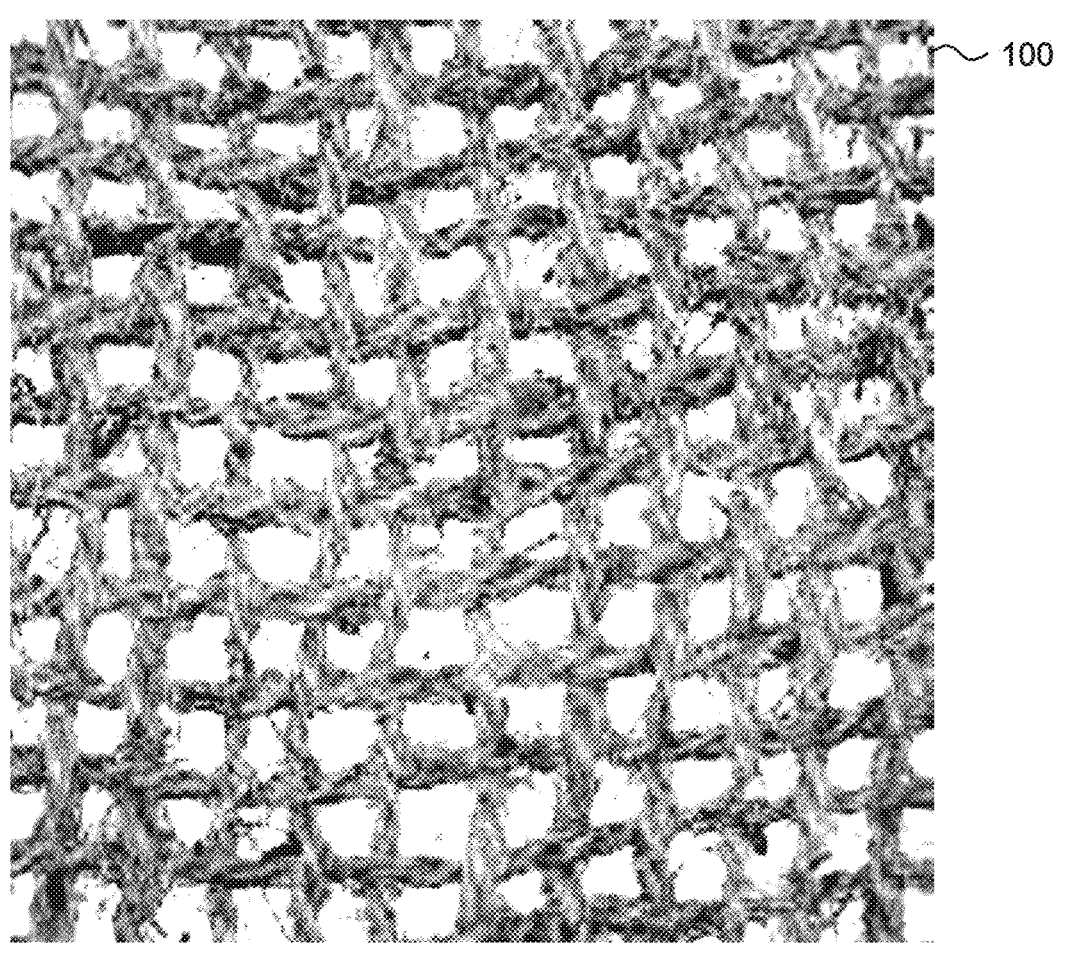
FIG. 2A is a top perspective view of a coir fiber mat used in an embodiment of the present invention.
Figure 2B:
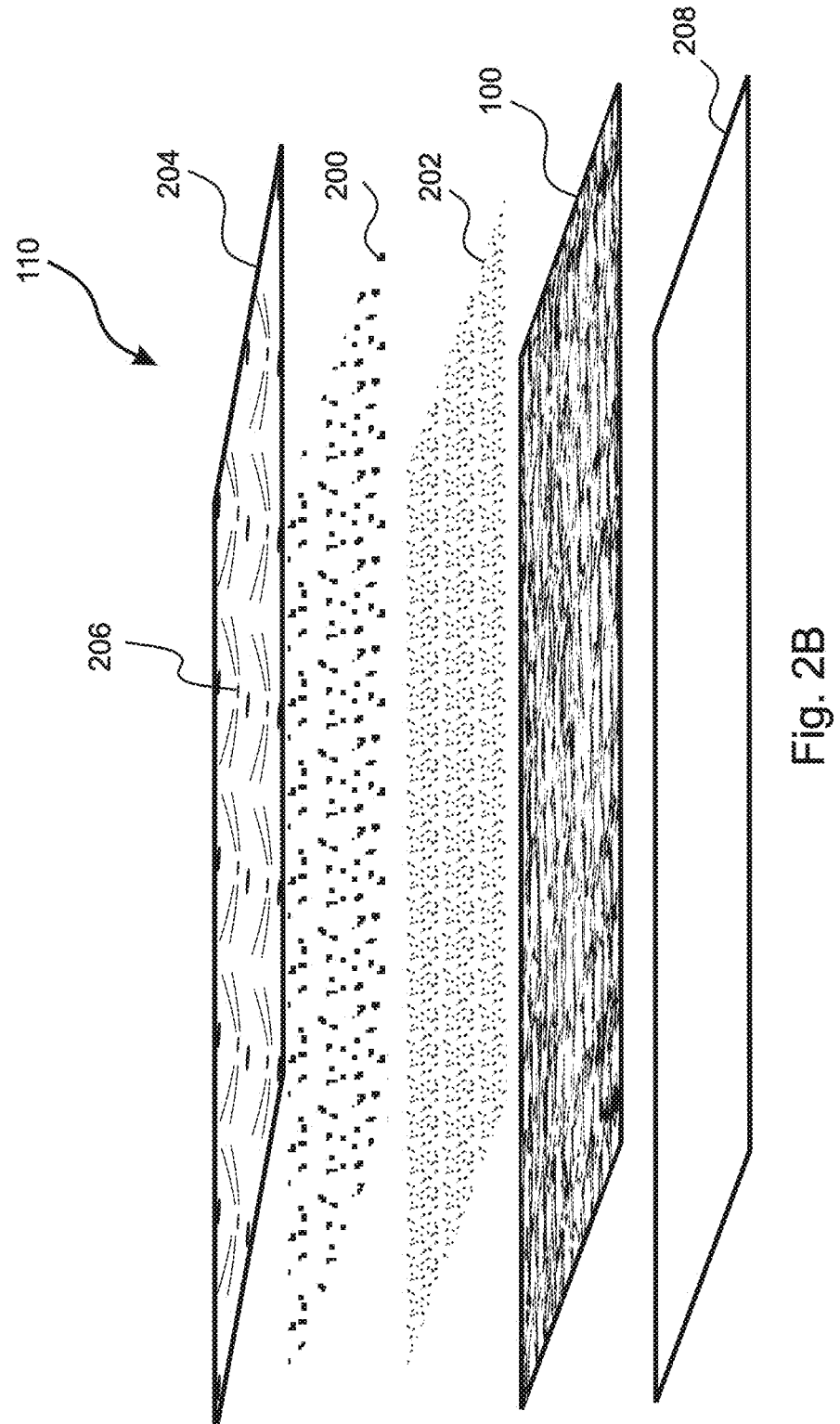
FIG. 2B is a side perspective exploded view illustrating the elements included in the mat assembly in an embodiment of the present invention.

With reference to FIGS. 2A and 2B, once the flowing water has been identified and/or established in the remote arid region, a mat assembly 110 is used to introduce an initial quantity of vegetation in the selected region that will be sufficient to provide food for beavers, and to serve as building materials that the beavers can use to build dams. The mat assembly 110 comprises a mat 100, which can be a biodegradable coir mat 100. With continuing reference to the exploded view of FIG. 2, the mat 100 is impregnated with seeds and/or seedlings 200 and with a "super absorbent polymer" or "SAP" 202. In embodiments, the SAP 202 is biodegradable, and in some of these embodiments the SAP 202 is a cellulose-based or starch-based polymer.

In various embodiments, the mat assembly 110 further comprises a perforated cover sheet 204 that is transparent or semi-transparent. The cover sheet 204 serves as a physical barrier to water vapor beneath the cover sheet 204 that is formed by evaporating dew, and by any moisture that is evaporated from the ground or mat 100, so that the water vapor tends to condense on the under-side of the cover sheet 204, and to drip back onto the mat 100, where it is absorbed by the SAP 202. Perforations 206 are provided in the cover sheet 204 which allow rain water to collect and penetrate through the cover sheet 204 to the mat 100. In embodiments, the perforations 206 are in locations where rain water will naturally collect.

In some embodiments, the mat assembly 110 further include a water barrier 208 placed below the mat 100, which prevents any water that is not retained by the mat 100 and SAP 202 from reaching the underlying soil or sand. This feature can be especially helpful in sandy locations where any moisture that reaches the underlying sand will be quickly absorbed and lost. The water barrier 208 can be a plastic sheet, and can be cellulosic or otherwise biodegradable.

In some embodiments, fertilizer (not shown) is included in the mat assembly 110. And in various embodiments at least one of sand and soil (not shown) is included in the mat assembly 110. The included sand or soil in some of these embodiments has a composition that is similar to sand or soil that is indigenous to the hot, arid location.

Figure 3A:
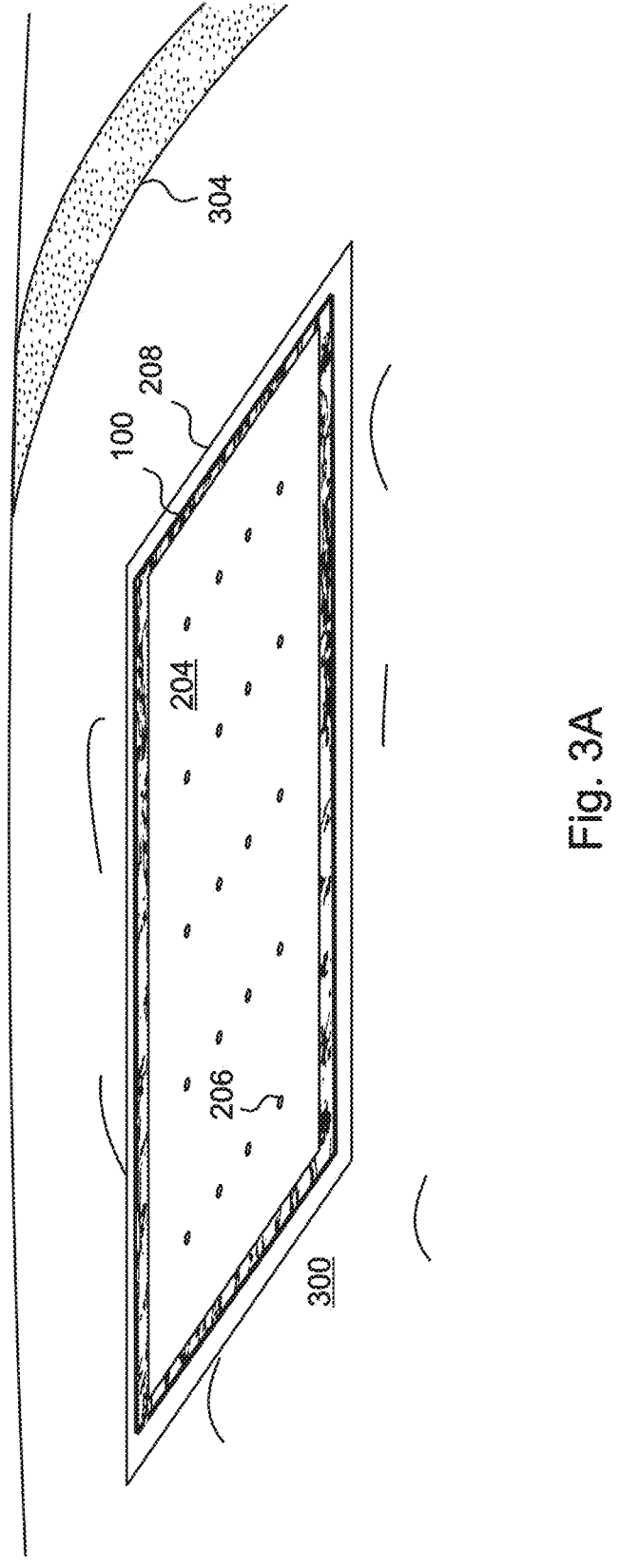
FIG. 3A is a perspective view of a mat assembly placed at a hot, arid location in an embodiment that includes a water barrier beneath the mat, and wherein the transparent cover is placed directly onto the mat.
Figure 3B:
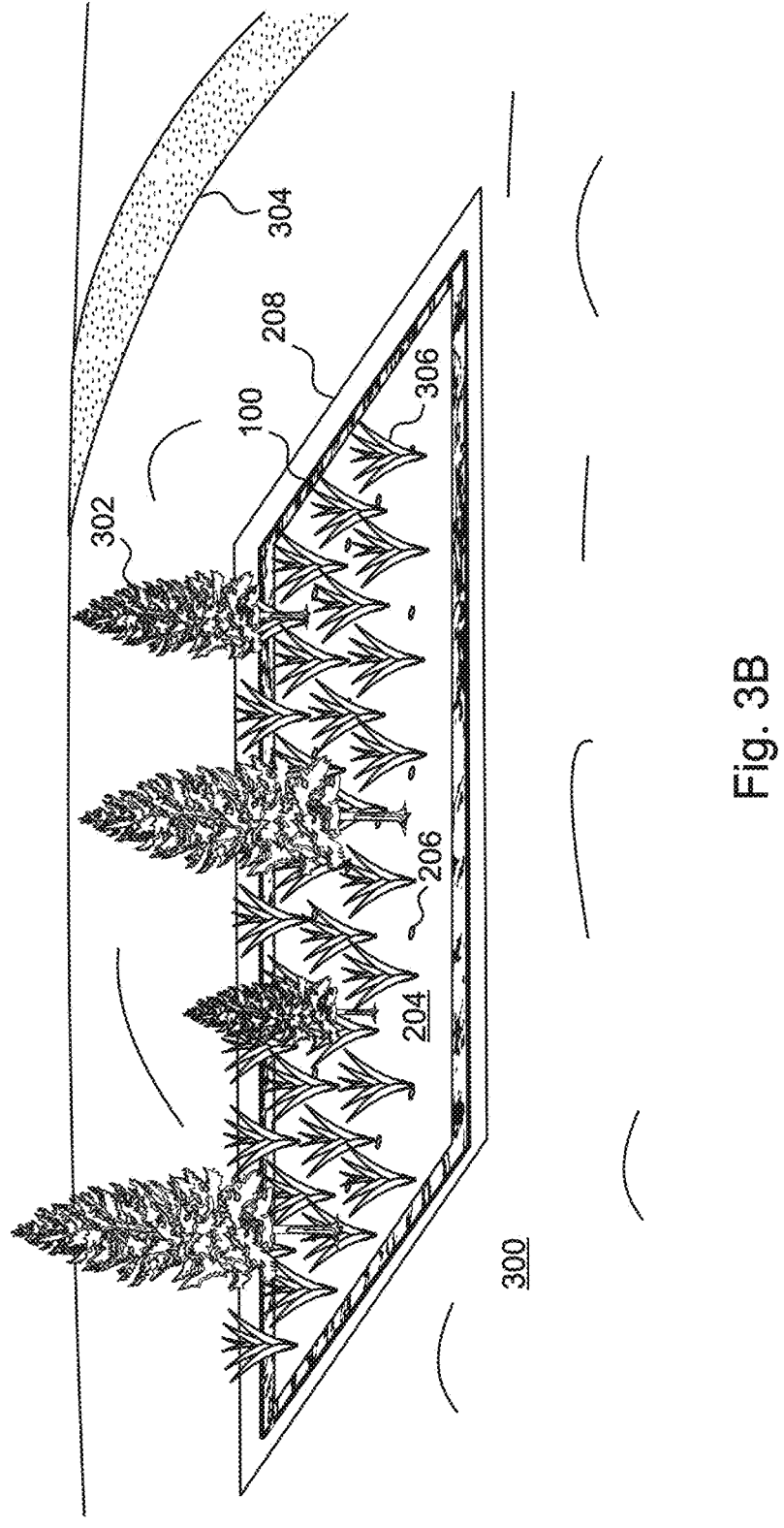
FIG. 3B is a perspective view of the mat assembly of FIG. 3A shown after the seeds and/or seedlings have sprouted and broken through the transparent cover.

With reference to FIG. 3A, in some embodiments the mat assembly 110 is placed in a selected region 300 of the remote arid environment proximate a channel 304 through which water is flowing. The mat assembly 110 is placed either at grade, or slightly below grade, and sufficient fresh water from the proximate channel 304 is applied to the mat 100, causing the SAP 202 in the mat 100 to become hydrated, and thereby enabling the seeds and/or seedlings 200 to sprout and/or take root in the mat 100 and burst through the cover sheet 204, as shown in FIG. 3B. The resulting vegetation includes vegetation 306 that is edible by beavers, as well as vegetation 302 that can be used by beavers to build dams. In various embodiments, the vegetation 302 that can be used to make dams includes bushes and shrubs, and/or trees.

Figure 4:
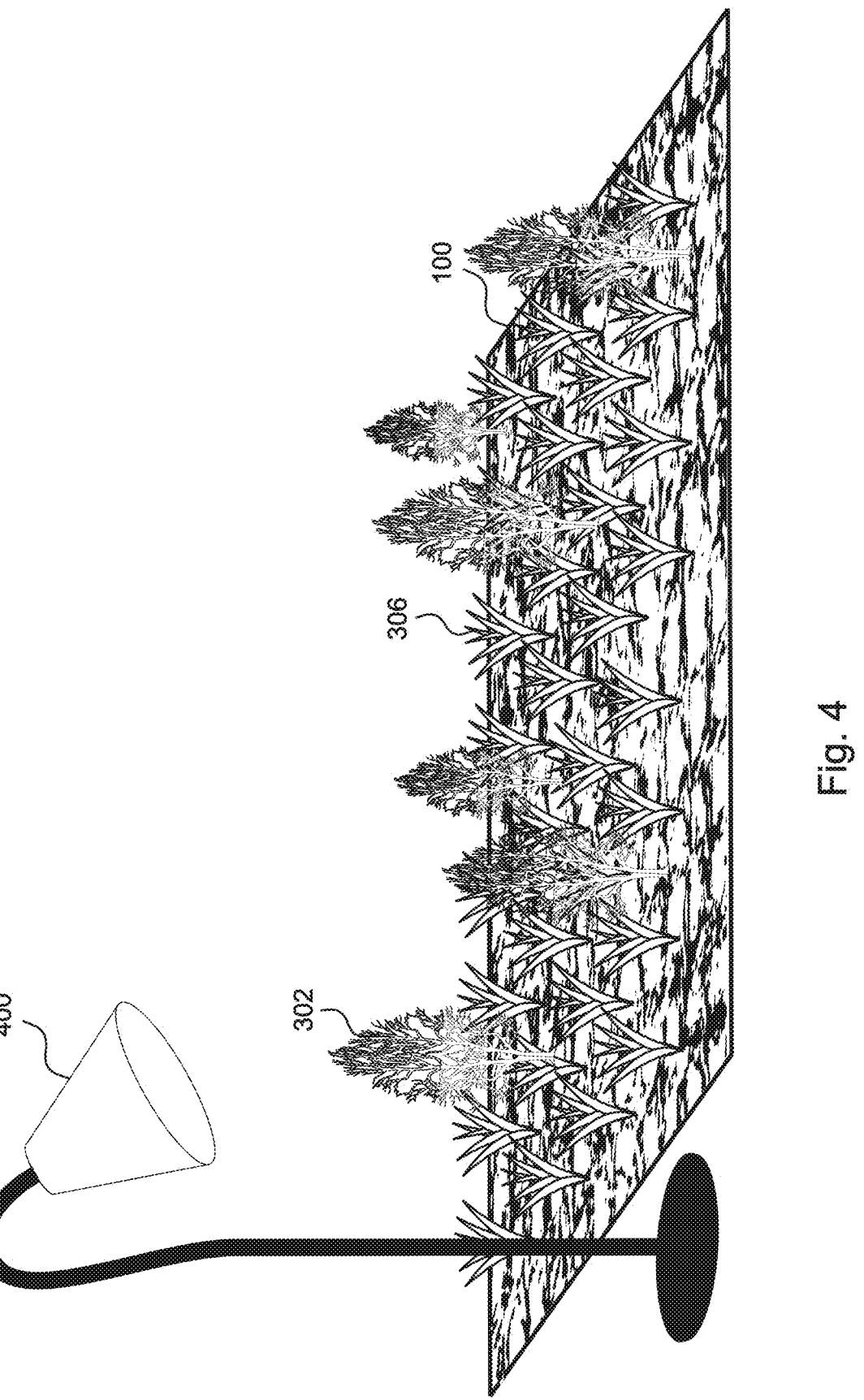
FIG. 4 is a perspective view of a mat assembly similar to FIG. 3B, in an embodiment where the vegetation is sprouted and rooted in the mat under controlled conditions before the mat is placed at the hot, arid location.

With reference to FIG. 4, in other embodiments the seeds and/or seedlings 200 are allowed to take root in the mat 100 in a climate-controlled environment, which can include artificial lighting 400, before the mat 100 is transferred to the arid region 300.

Figure 5A:
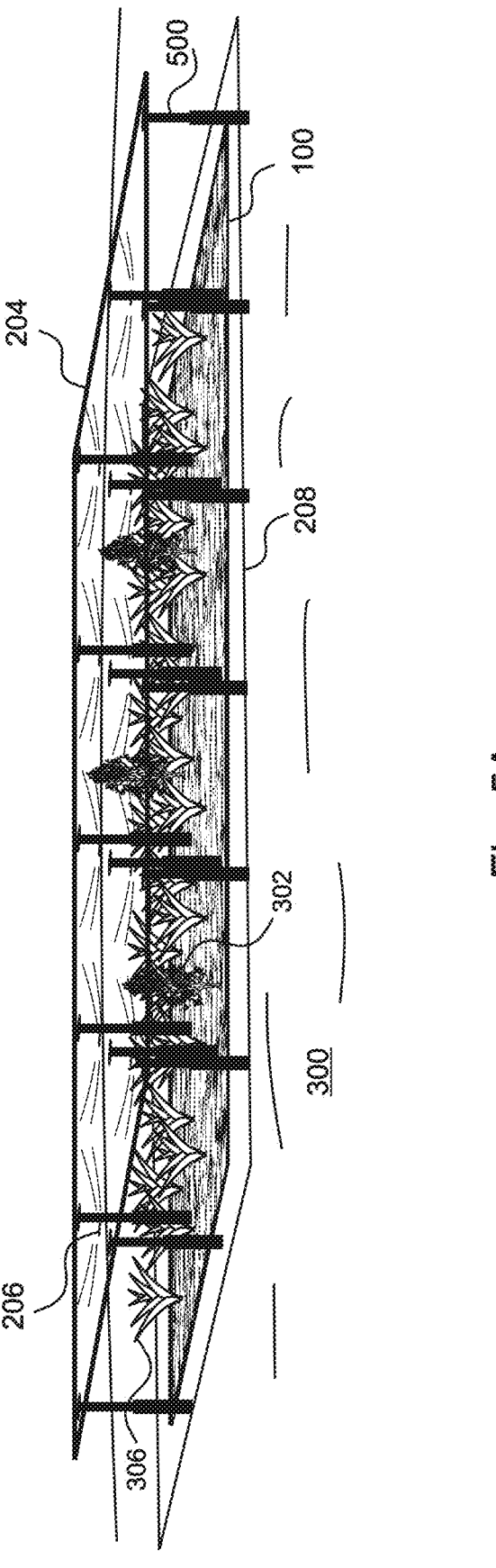
FIG. 5A is a perspective view of an embodiment of the present invention that includes a transparent perforated cover sheet suspended above the mat by stakes.
Figure 5B:
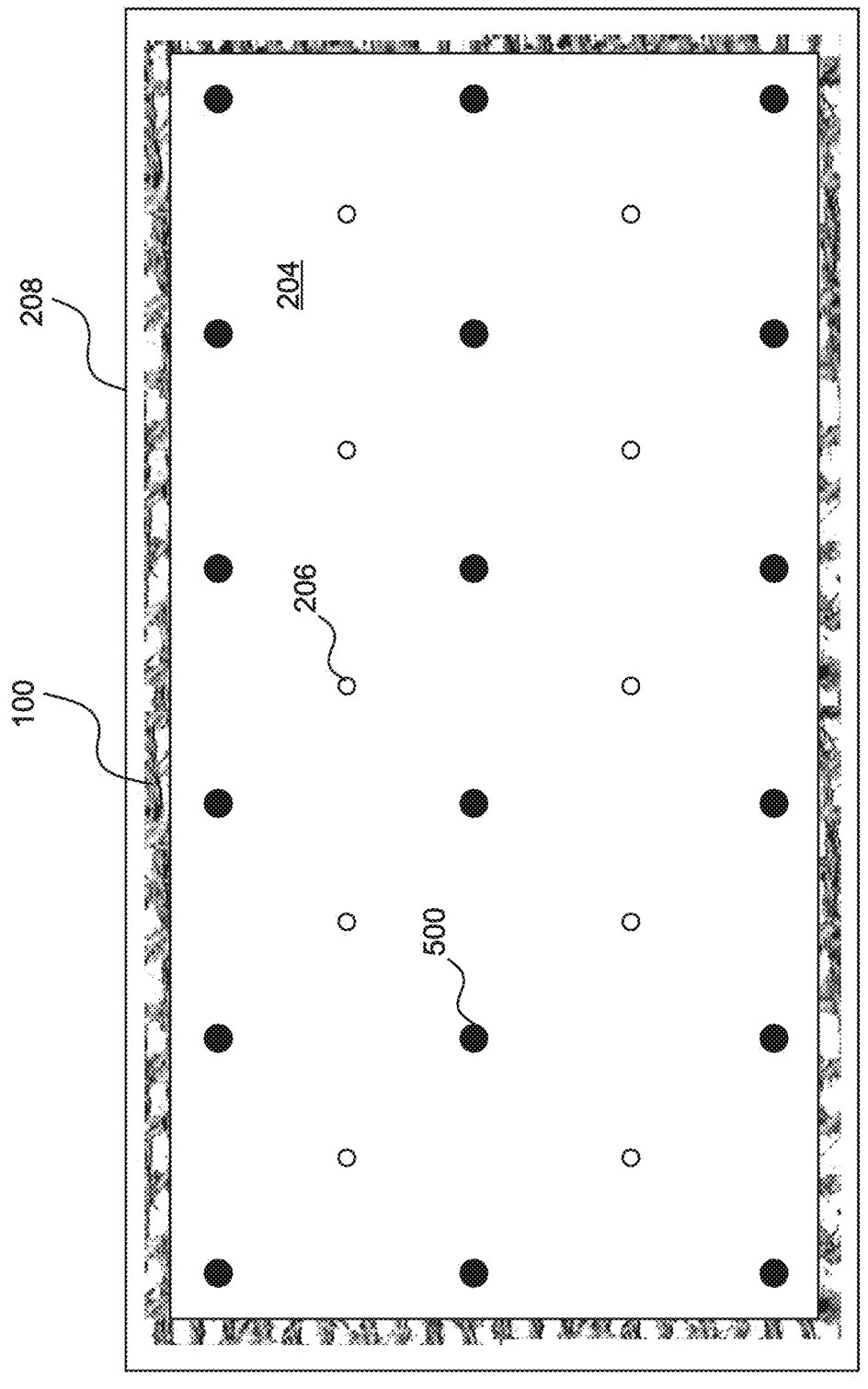
FIG. 5B is a top view of the embodiment of FIG. 5A, where the cover sheet is shown as if it were opaque for clarity of illustration.

With reference to FIGS. 5A and 5B, in various embodiments, the cover sheet 204 of the mat assembly 110 is supported above the mat 100 by stakes 500, which can be adjustable in height, for example due to a threaded, telescoping configuration. Similar embodiments use other support structures that are either fixed or adjustable in height. In the embodiment of FIGS. 5A and 5B, the cover sheet 204 is elevated by the stakes 500, such that the region below the cover sheet 204 is ventilated, thereby avoiding excess heating of the vegetation 302, 306. FIG. 5A is a perspective side view of the illustrated embodiment, while FIG. 5B is a top view of the same embodiment, in which the cover sheet 204 is rendered as if it were opaque for clarity of illustration. Similar elevated cover sheets 204 are implemented in some embodiments where the seeds 200 are caused to initially sprout after placement of the mat 100 at the arid location 300.

In some embodiments the cover sheet 204 is transparent, as shown in FIG. 5A. In similar embodiments, for example where there is excessive direct sunshine, the transparency of the cover sheet 204 is decreased by printing a pattern onto the cover sheet 204, adding a dye to the sheet material of the cover sheet, or by any other means known in the art, so as to reduce the intensity of light reaching the mat 100 and vegetation 302, 306, thereby simulating the shade that would be provided by mature vegetation in an established ecosystem.

Figure 6:
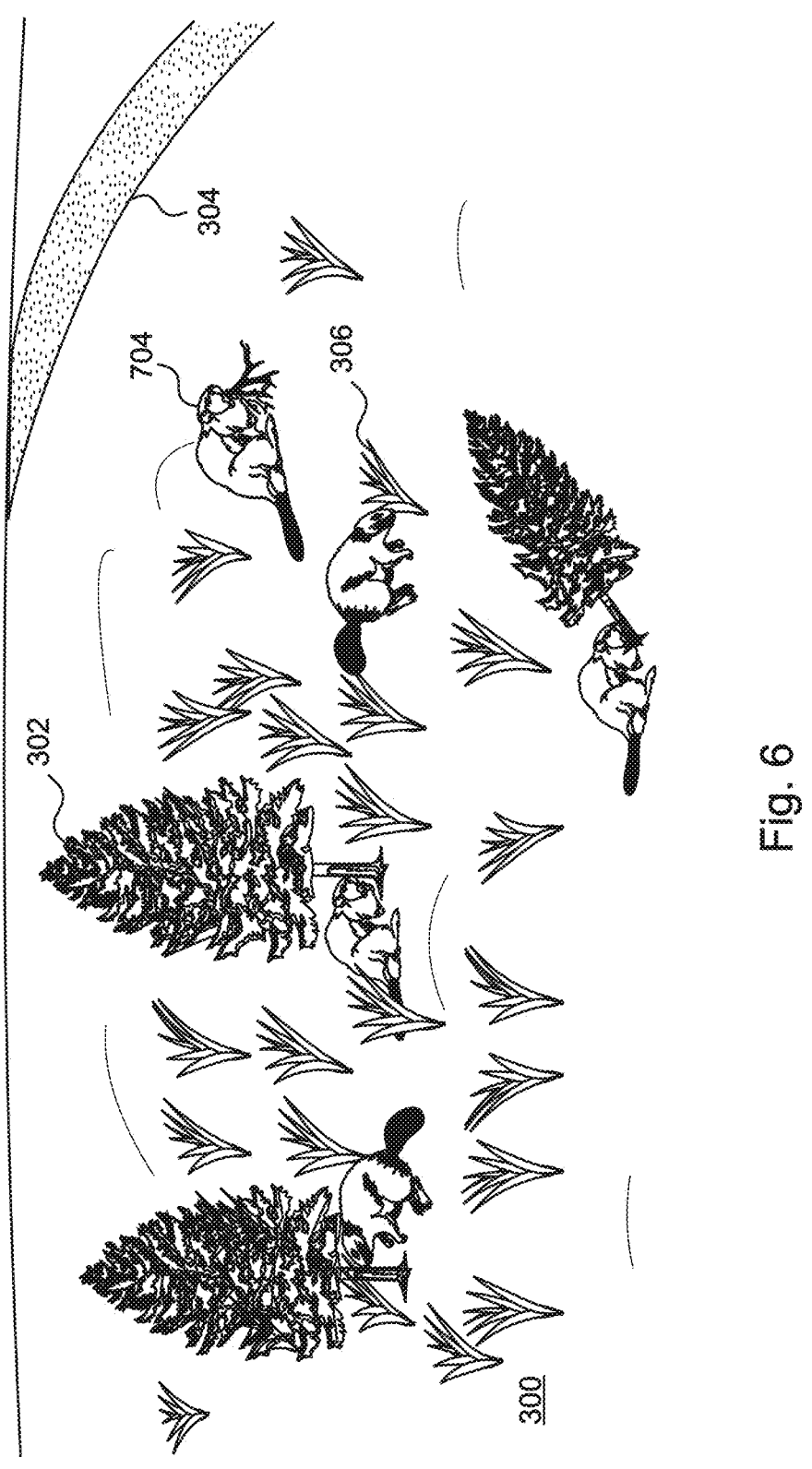
FIG. 6 is a perspective view of the remote arid location after the vegetation arising from the seeds and/or seedlings in the mat have grown and matured, and beavers have been introduced into the location.

With reference to FIG. 6, once an initial quantity of vegetation 302, 306 has been established in the selected region 300 of the remote arid environment 102, beavers 704 are introduced into the remote area.

Figure 7:
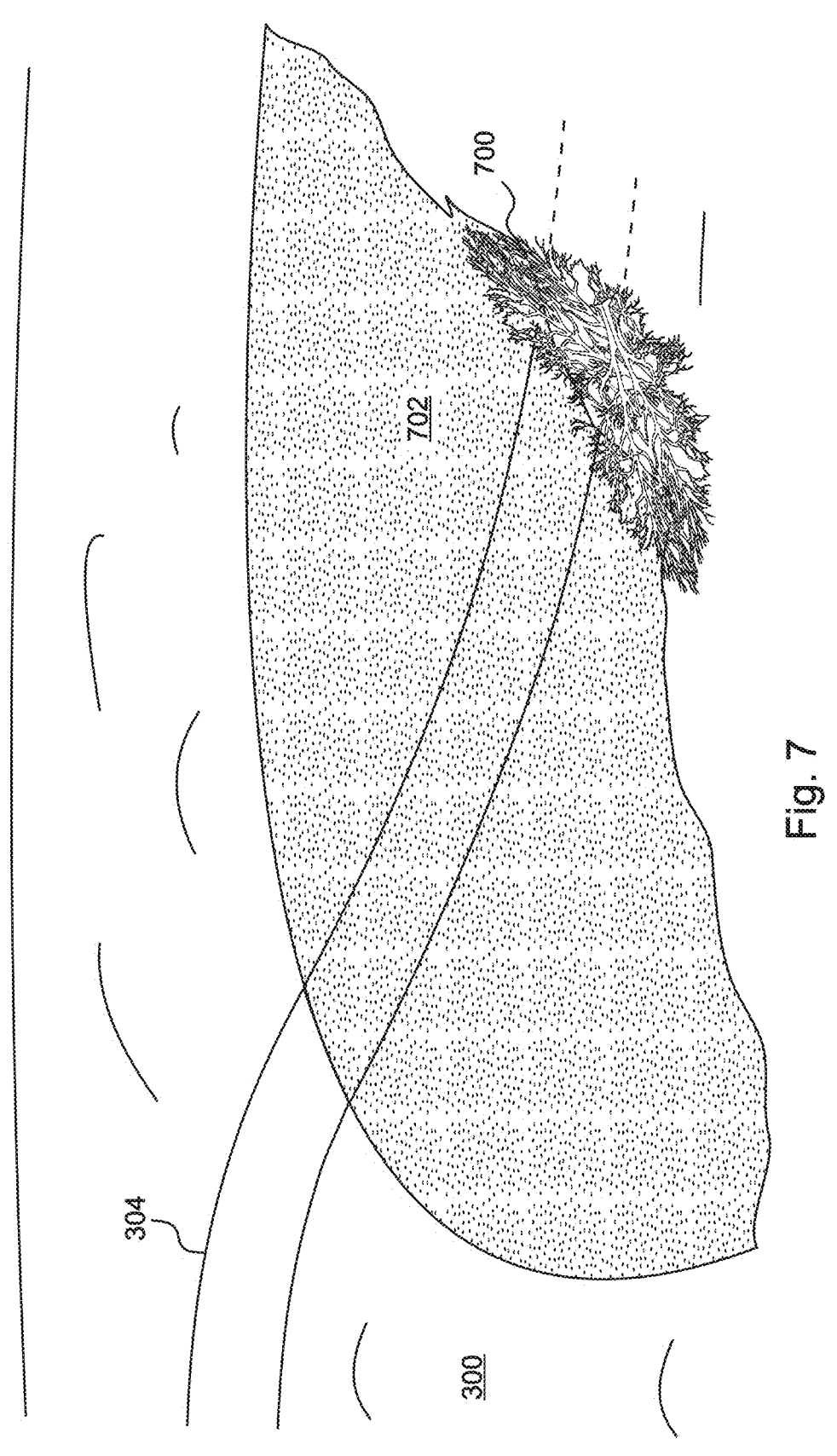
FIG. 7 is a perspective view from above of the region of FIG. 1B that has been flooded by water due to damming of the channel by the beavers.

With reference to FIG. 7, due to the presence of flowing water in the channel 304, and the initial quantity of vegetation 302, 306, the beavers 704 naturally commence to build dams 700 across the channels 304 of flowing water, thereby flooding a nearby region 702.

Figure 8:
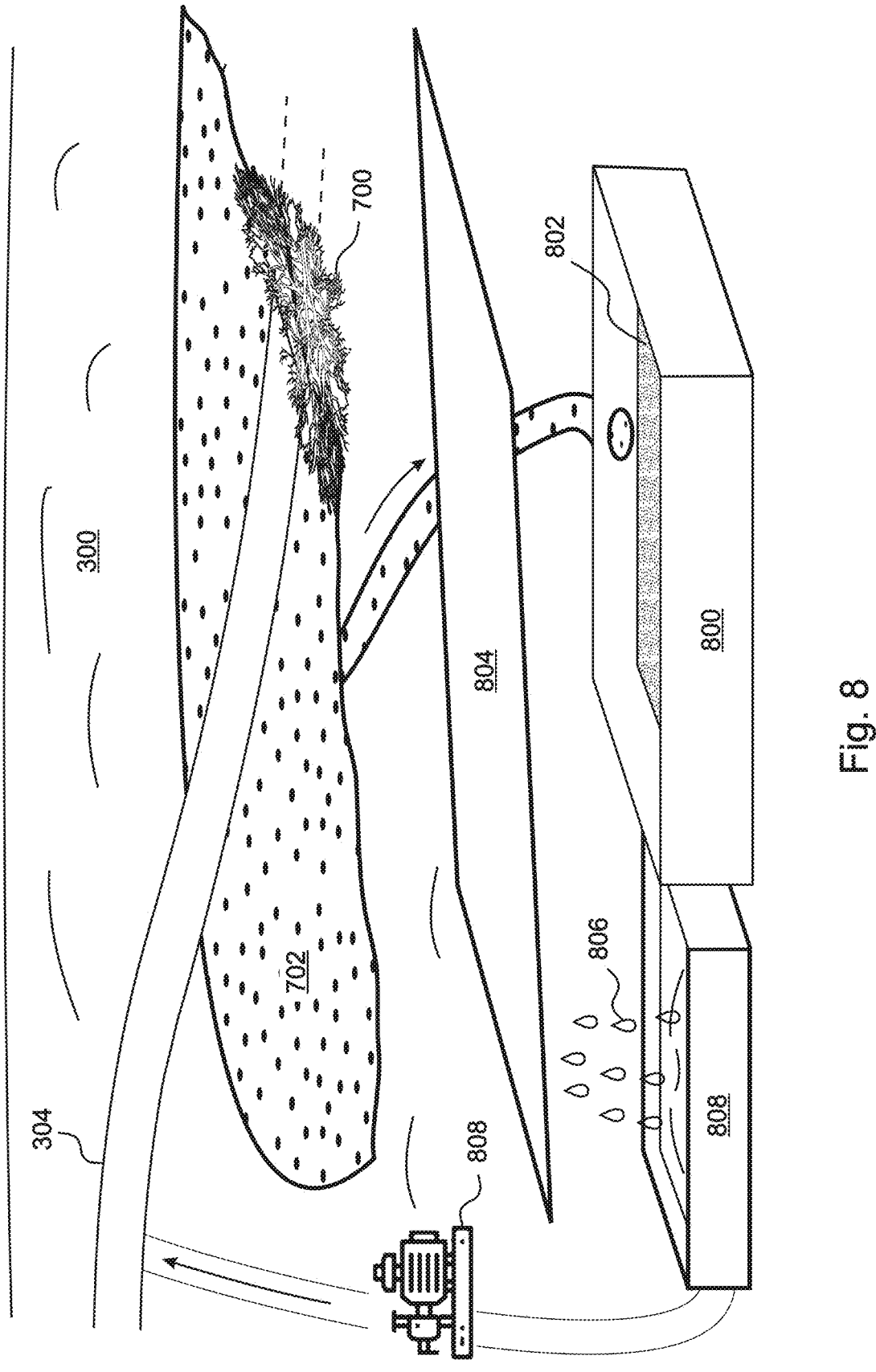
FIG. 8 is a perspective view from the side that illustrates extraction of the flood water into an evaporation pond for extraction of the water-soluble minerals, while the evaporated water is recaptured and reintroduced into the channel.

With reference to FIG. 8, after sufficient time has elapsed to allow the water to dissolve the underlying minerals, the water is drained from the flooded region 702. In some embodiments, the drained water is transported to a remote facility where the dissolved minerals are extraction, for example by reverse osmosis. In the embodiment of FIG. 7, the drained water is directed to one or more solar evaporation ponds 800, where the water is evaporated, leaving behind the extracted minerals 802. In the illustrated embodiment, the evaporated water is recaptured, e.g. by locating a slanted, transparent cover 804 over the evaporation pond 800 that causes the evaporated water to condense and be drained away. The recaptured water 806 is then introduced into a catch pond 808, from which it is caused by a pump 810 to flow back to the channel 304. The water is thereby recirculated between the evaporation pond 800 and the arid environment 300, allowing the same water to deliver multiple "batches" of minerals 802 to the evaporation pond.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the disclosure is not limited to just these forms, but is amenable to various changes and modifications. The present application does not explicitly recite all possible combinations of features that fall within the scope of the disclosure. The features disclosed herein for the various embodiments can generally be interchanged and combined into any combinations that are not self-contradictory without departing from the scope of the disclosure. In particular, the limitations presented in dependent claims below can be combined with their corresponding independent claims in any number and in any order without departing from the scope of this disclosure, unless the dependent claims are logically incompatible with each other.

What is claimed is:

1. A method of extracting water-soluble minerals from an arid location, the method comprising:

identifying or establishing a channel of flowing water at the arid location;

placing a mat assembly at the arid location, the mat assembly comprising:

a mat;

a super-absorbent polymer ("SAP") cooperative with the mat; and seeds and/or seedlings cooperative with the mat, the seeds and/or seedlings comprising seeds and/or seedlings of edible vegetation and seeds and/or seedlings of vegetation that is suitable for constructing dams;

applying fresh water to the mat, thereby hydrating the SAP in the mat;

allowing the seeds and/or seedlings to mature into the edible vegetation and the vegetation that is suitable for constructing dams;

placing beavers at the arid location;

allowing the beavers to eat the edible vegetation, and to construct at least one dam across the channel of flowing water using the vegetation that is suitable for constructing dams, thereby causing the water to flood a region proximate the channel;

allowing the water to remain in the flooded region, thereby causing the water-soluble minerals to be dissolved in the water;

removing the water from the flooded region; and extracting the water-soluble minerals from the water.

2. The method of claim 1, wherein applying the fresh water to the mat comprises applying water from the channel of flowing water to the mat.

3. The method of claim 1, wherein the vegetation comprises at least one of bushes and trees.

4. The method of claim 1, wherein the mat includes coir.

5. The method of claim 1, wherein the mat assembly further comprises fertilizer cooperative with the mat.

6. The method of claim 1, wherein the mat assembly further comprises at least one of sand and soil cooperative with the mat.

7. The method of claim 1, wherein the mat assembly further comprises a perforated, transparent or translucent cover sheet covering the mat.

8. The method of claim 7, wherein the cover sheet is applied directly to the mat, such that it rests on the mat.

9. The method of claim 7, wherein the cover sheet is suspended above the mat by a support structure.

10. The method of claim 9, wherein the support structure includes a plurality of stakes that support the cover sheet at spaced-apart support locations below the cover sheet.

11. The method of claim 10, wherein the cover sheet is perforated at locations that are spaced apart from the support locations of the stakes.

12. The method of claim 1, wherein the mat assembly further comprises a water barrier installed below the mat.

13. The method of claim 1, wherein establishing the channel of flowing water at the arid location comprises drawing water from an underground aquifer and causing it to flow into the channel of flowing water.

14. The method of claim 1, wherein establishing the channel of flowing water at the arid location comprises drawing water from a surrounding non-arid region and causing it to flow into the channel of flowing water.

15. The method of claim 1, wherein establishing the channel of flowing water at the arid location comprises desalinating brackish water and causing it to flow into the channel of flowing water.

16. The method of claim 1, wherein establishing the channel of flowing water at the arid location comprises modifying or replacing at least one solar evaporation pond within the arid location, such that water previously lost to evaporation from the solar evaporation pond is retained and caused to flow into the channel of flowing water.

17. The method of claim 1, wherein extracting the water-soluble minerals from the water comprises transporting the water to a remote facility where the water-soluble minerals are extracted from the water.

18. The method of claim 17, wherein the minerals are extracted from the water using reverse osmosis.

19. The method of claim 1, wherein extracting the water-soluble minerals from the water comprises directing the water to an evaporation pond where the water evaporates, while the water-soluble minerals are retained.

20. The method of claim 19, wherein the method further comprises recapturing the water that is evaporated from the evaporation pond, and returning the recaptured water to the channel.

* * * * *